United States Patent
Hiroki et al.

(10) Patent No.: US 6,594,032 B1
(45) Date of Patent: Jul. 15, 2003

(54) FACSIMILE APPARATUS AND ELECTRONIC MAIL SERVER

(75) Inventors: Shinya Hiroki, Fukuoka (JP); Yoshinori Ikeguchi, Fukuoka (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/426,885

(22) Filed: Oct. 26, 1999

(30) Foreign Application Priority Data

| Oct. 28, 1998 | (JP) | 10-306604 |
| Oct. 30, 1998 | (JP) | 10-310018 |
| Oct. 30, 1998 | (JP) | 10-310019 |

(51) Int. Cl.[7] .............................................. G06K 15/00
(52) U.S. Cl. ..................... 358/1.15; 358/400; 358/403; 358/405; 709/206
(58) Field of Search ............................... 358/1.15, 1.16, 358/402, 407, 403; 709/206, 207

(56) References Cited

U.S. PATENT DOCUMENTS

| 5,892,591 | A |   | 4/1999  | Anglin, Jr. et al. | 358/407    |
| 5,940,598 | A |   | 8/1999  | Strauss et al.     | 395/200.79 |
| 5,978,837 | A | * | 11/1999 | Foladare           | 709/207    |
| 5,999,965 | A |   | 12/1999 | Kelly              | 709/202    |
| 6,023,345 | A | * | 2/2000  | Bloomfield         | 358/402    |
| 6,025,931 | A | * | 2/2000  | Bloomfield         | 358/402    |
| 6,028,679 | A | * | 2/2000  | Murphy             | 358/407    |
| 6,028,982 | A | * | 2/2000  | Toyoda             | 395/114    |
| 6,097,797 | A | * | 8/2000  | Oseto              | 379/100.08 |
| 6,128,646 | A | * | 10/2000 | Miloslavsky        | 709/206    |
| 6,157,706 | A |   | 12/2000 | Rachelson          | 379/100.08 |
| 6,192,045 | B1|   | 2/2001  | Williams et al.    | 370/352    |
| 6,243,376 | B1|   | 6/2001  | Ng et al.          | 370/352    |
| 2001/0012120 | A1 | * | 8/2001 | Mori             | 358/1.15   |
| 2001/0051986 | A1 | * | 12/2001 | Bettis          | 709/206    |
| 2002/0048046 | A1 | * | 4/2002 | Unno             | 358/1.16   |

FOREIGN PATENT DOCUMENTS

| EP | 1024652  | * | 2/2000  | H04N/1/00 |
| JP | 9247334  |   | 9/1997  | H04N/1/00 |
| JP | 10107938 |   | 4/1998  | H04N/1/00 |
| JP | 10164337 |   | 6/1998  |           |
| JP | 10171733 |   | 6/1998  |           |
| JP | 11243469 |   | 9/1999  | H04N/1/00 |

* cited by examiner

Primary Examiner—Jerome Grant, II

(57) ABSTRACT

A facsimile apparatus and electronic mail (e-mail) server capable of transmitting e-mails containing therein facsimile image data while reducing complexities. In the facsimile apparatus, when a user manually operates an "E-mail" button while letting more than one paper document for transmission be inserted into a document tray, the apparatus visually displays a destination address along with a prompt message requesting the user to input mail text data to be delivered. After the user enters such mail text together with the address and then presses a "Send" button, the apparatus operates to optically read for recognition the document as presently set in the document tray to produce corresponding graphic image information of such document (fax data), which will then be sent forth toward the e-mail server along with the destination address and text data. It becomes possible to readily perform e-mail transmission of both the text data and fax data at a time.

10 Claims, 10 Drawing Sheets

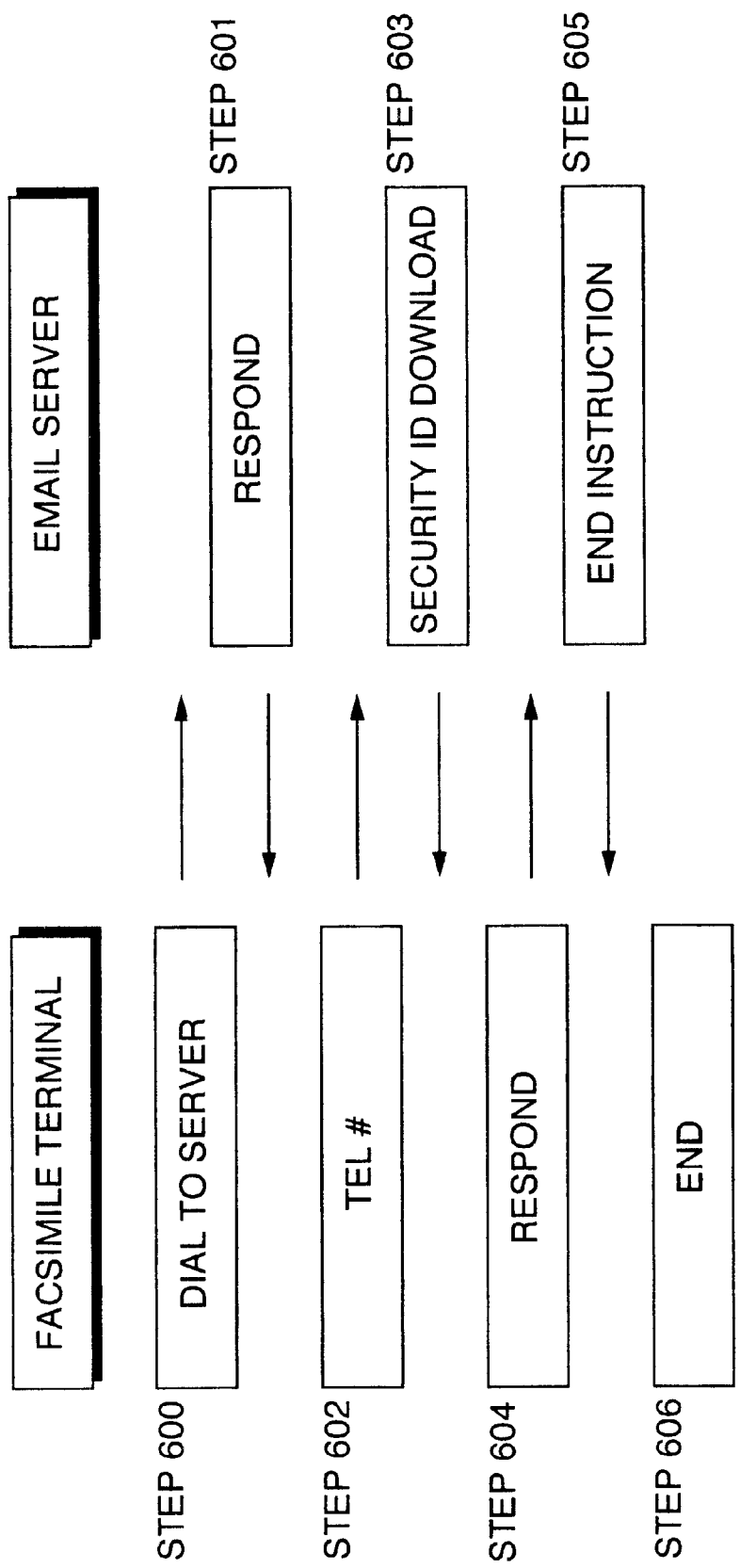

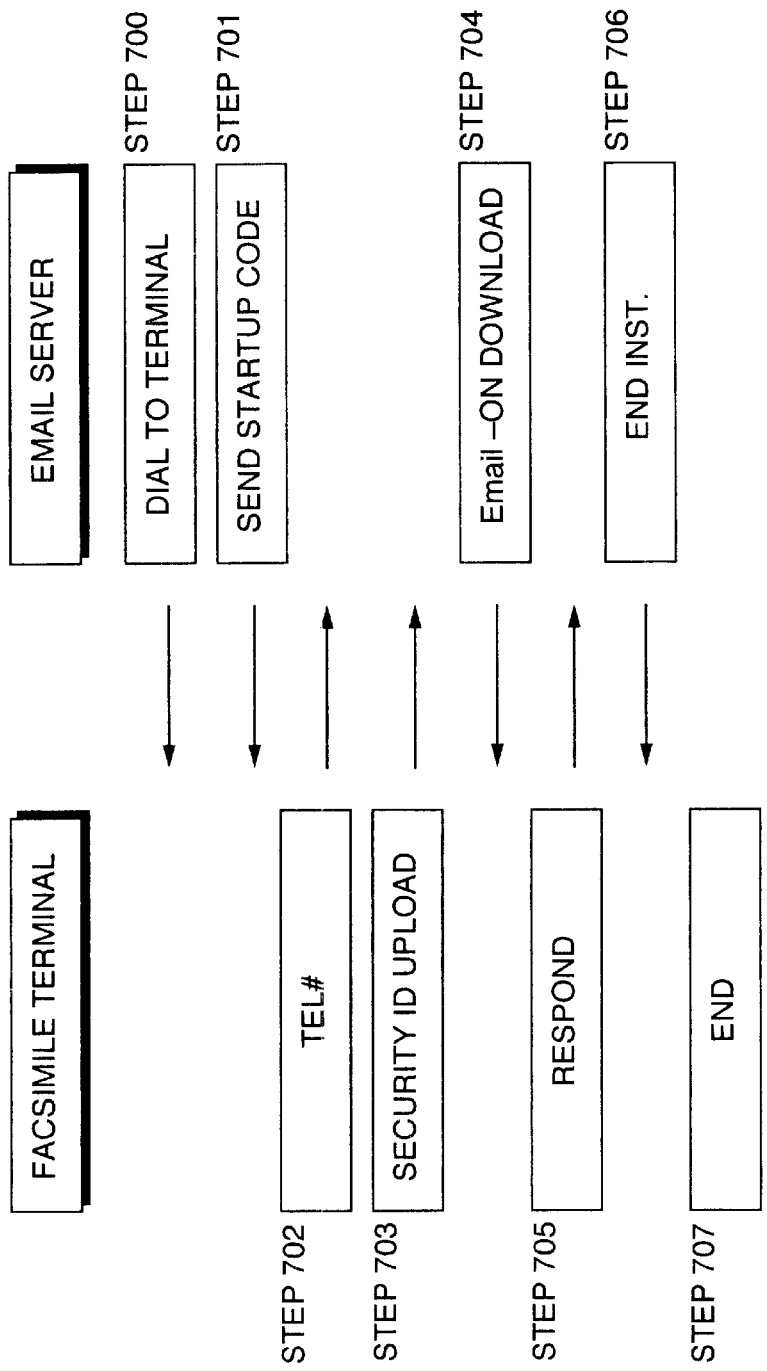

FACSIMILE APPARATUS AND ELECTRONIC MAIL SERVER

BACKGROUND OF THE INVENTION

The present invention relates to facsimile apparatus with electronic mail ("e-mail") send/receive functionalities and also to e-mail servers operatively associated therewith.

In recent years, e-mail functions have become an inevitable part of usual business life and thus are becoming important more and more in advanced office-use telecommunications systems. Implementation of such e-mail functions may typically require use of personal computers (PCs). Currently available PCs are designed to offer an ability to simultaneously transmit over communication links both message text data and graphics image data or else as supplementary files attached thereto. Unfortunately, to take full advantages of e-mail services, ordinary business users are required to have special knowledge as to initial system configuration setup procedures including, but not limited to, provider settings, domain name system (DNS) setup, and Internet protocol (IP) address setup. Setting up a system's e-mail configuration is one of the most daunting tasks, which in turn makes it very difficult for untrained PC users to successfully utilize online e-mail services.

To transmit graphics image data by use of e-mail services, users are required to perform troublesome and time-consuming tasks, including data entry through PC keyboards, such as inputting of an e-mail destination address of a receiving side or "called" party on the other end of the line, typing e-mail message text, and further preparing, prior to manual key/button operations, a graphics data file for transmission with its specific file name added thereto by means of key-input or menu-selection schemes. One prior known approach to breaking through such difficulties is to employ an Internet-based email/facsimile transmit/receive system, which is designed to achieve interconnection via public communication links to an e-mail server coupled to a wide-area network or internetwork, called "Internet," and then request the e-mail server to send forth the graphics image data from facsimile apparatus by way of the Internet links.

Regrettably, prior art Internet facsimile systems are arranged to handle facsimile data alone and thus are incapable of transmitting text data of messages or else along with facsimile data simultaneously.

SUMMARY OF THE INVENTION

It is therefore an object of the present invention to provide an improved facsimile apparatus and electronic mail server capable of avoiding the problems faced with the prior art.

It is another object of this invention to provide a facsimile apparatus and e-mail server capable of sending e-mails each containing fax image data while reducing complexities.

To attain the foregoing objects, according to one aspect of the invention, there is provided a specific facsimile apparatus as operatively connected via public communications links to an electronic mail or "e-mail" server that in turn is coupled to the currently available wide-area internetwork, typically known as "Internet." The facsimile equipment is arranged to include a data entry device for use in inputting information and in performing a variety of kinds of operations. The facsimile machine also includes a controller unit operable to request an operator or user to input a transmission destination address along with text of a mail message and then transmit toward the e-mail server both the text data as input through the data entry device and facsimile data such as scanned document image data at a time. With such an arrangement, it becomes possible to easily send text data and fax image data via e-mail transmission services by using the Internet and/or local area network (LAN).

In accordance with another aspect of the invention as disclosed herein, an e-mail server that is linked to the Internet network and also to public communication network is provided. The e-mail server is arranged to have the functions of: returning a response upon receipt of access from the public network; performing, upon receiving of user information including password from a transmitter side terminal, identification of a user based on the user information; requesting an address of a target party for transmission of a mail thereto when the user identification has been done successfully; in responding to transmission of the target party's address from the transmitter terminal, to which address the mail is to be routed, requesting a receiver side terminal to provide the content of a message under transmission; upon transmission of message text data from the receiver terminal, requesting the receiver terminal to send fax data under transmission; and receiving fax image data as sent from the transmitter terminal to send it as a mail toward the Internet network with the received text data as a mail text and with a fax document as a supplementary or "appendix" file attached thereto. With such an arrangement, it is possible for the e-mail server to transmit via the Internet the text data along with the fax image data as requested from facsimile equipment to be delivered.

In accordance with still another aspect of the invention, a method of performing online contract between a facsimile machine and an e-mail server is provided. The facsimile machine is operable to upload its own telephone number toward an e-mail server system. The e-mail server system downloads a security identification (ID) with respect to the facsimile machine. Upon receipt of the security ID, the facsimile machine returns its reply to the e-mail server system and also terminates communications. Thereafter, the e-mail server system dials up at said telephone number thus uploaded. If a communication link is made between the e-mail server system and the facsimile machine then transmit to the facsimile a startup code indicating a server callup. The facsimile machine identifies the startup code to send the telephone number and the security ID to the e-mail server system. If these information items are free from errors then the e-mail server system sends to the facsimile machine certain data indicative of e-mail service allowability. The facsimile machine turns on a flag of such e-mail allowance in accordance with the data. Use of this methodology makes it possible to automate execution of contracts as to e-mail service utilization via online communications between facsimile machine and the e-mail server operatively associated therewith.

In accordance with a further aspect of the invention, a facsimile apparatus is provided which is connected via a public network to an e-mail server system as linked to an Internet network. The apparatus is configured including a storage unit for storing therein data or else, an e-mail button for instruction of e-mail communication, a domain name button for instruction of call-up of a domain name, a line controller unit for connection to a telephone network, a display device, and a system controller unit. This system controller is operable to: allow, when a user operates the e-mail button, the display device to display an indication requesting the user to input a telephone number; and control, when the user operates said domain name button after completion of entry of a destination address, read out for visual indication of information as to a domain name as stored in the storage unit. With such an arrangement, pre-registration of more than one specific domain of the target "customer" party to which transmission is made frequently may facilitate call-up of such a domain at any time when the need arises, which may in turn reduce human task complexities as to manual operations for domain data entry.

BRIEF DESCRIPTION OF THE DRAWINGS

FIG. 7 is a diagram showing a communication sequence for user registration in the facsimile machine;

FIG. 8 is a sequence chart showing a user registration communication sequence in the facsimile machine;

FIG. 9 explains one exemplary structure of data required for execution of registration in the facsimile machine;

DESCRIPTION OF THE PREFERRED EMBODIMENTS

Several embodiments of the present invention will be explained with reference to the accompanying drawings below.
(Embodiment 1)

Figure 1:
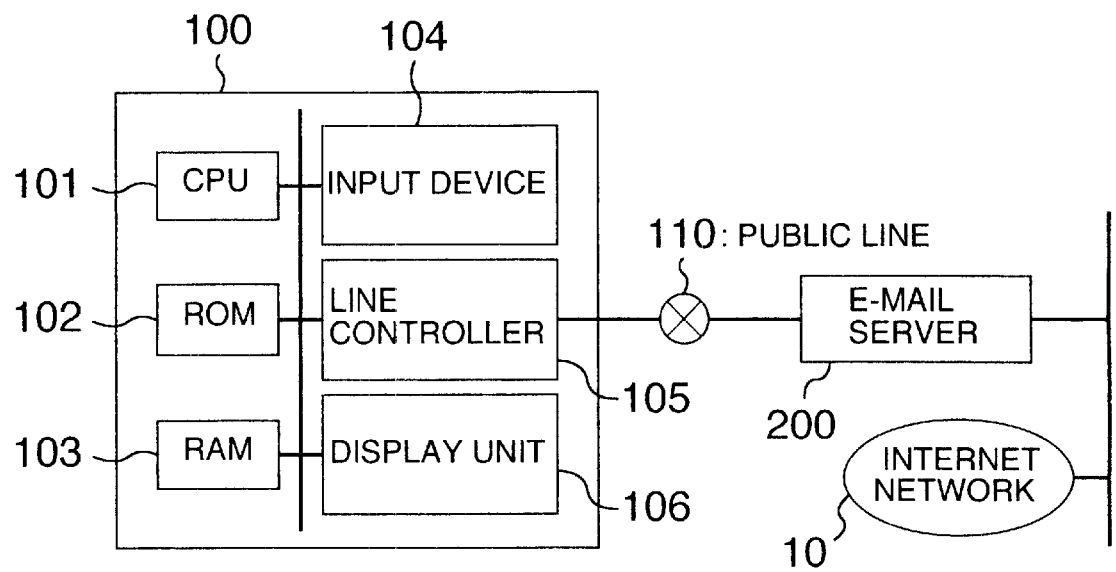
FIG. 1 is a diagram illustrating, in block form, an overall configuration of a data communications system including facsimile apparatus and its associative e-mail server in accordance with one embodiment of the present invention.

In FIG. 1, reference numeral "100" designates a facsimile apparatus embodying the invention whereas 200 denotes an electronic mail (e-mail) server system.

In the facsimile machine 100, numeral 101 designates a central processor unit (CPU) for control of the facsimile machine, 102 denotes a read-only memory (ROM) for storage of software programs, and 103 indicates a random access memory (RAM) storing therein data and others. Numeral 104 is used to designate a data entry device for use in inputting numbers and e-mail addresses and also performing a variety of kinds of operations. 105 denotes a communication line control unit for connection to a telephone network line. 106 is a display unit for visual indication of various information items concerned. The data entry device 104 includes a keypad with twelve basic key buttons along with an "E-mail" button used for instruction of e-mail send/receive events and a Start button for instruction of startup of facsimile transmission.

Figure 2:
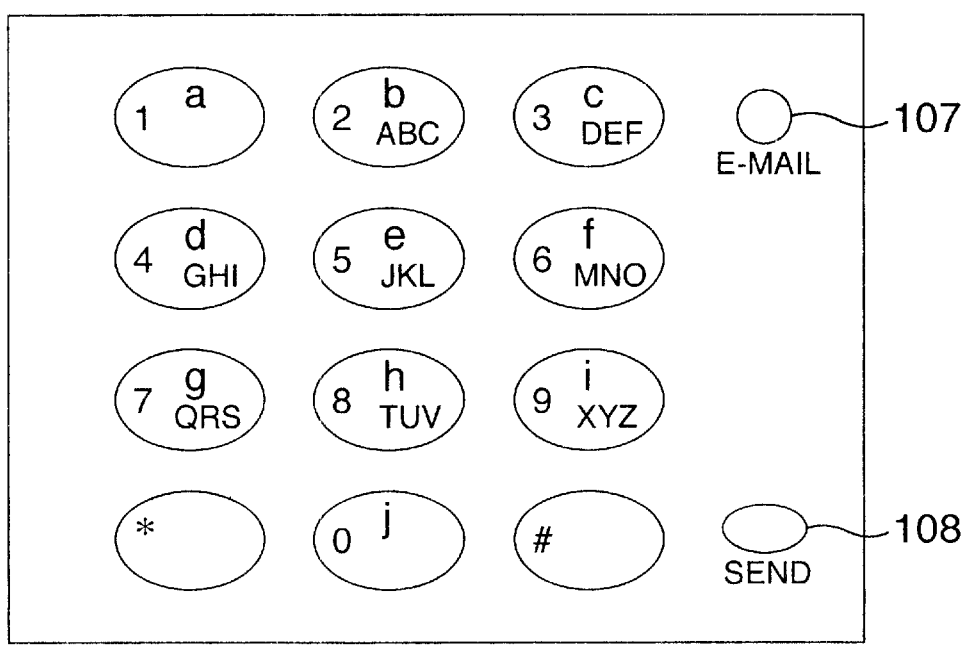
FIG. 2 is a diagram depicting one exemplary data entry device used in the facsimile equipment shown in FIG. 1.

One exemplary key layout of the input device 104 of FIG. 1 is shown in FIG. 2. In FIG. 2, numeral 107 designates the E-mail button for e-mail instruction whereas 108 denotes "Send" button for instruction of startup of transmission.

Figure 3:
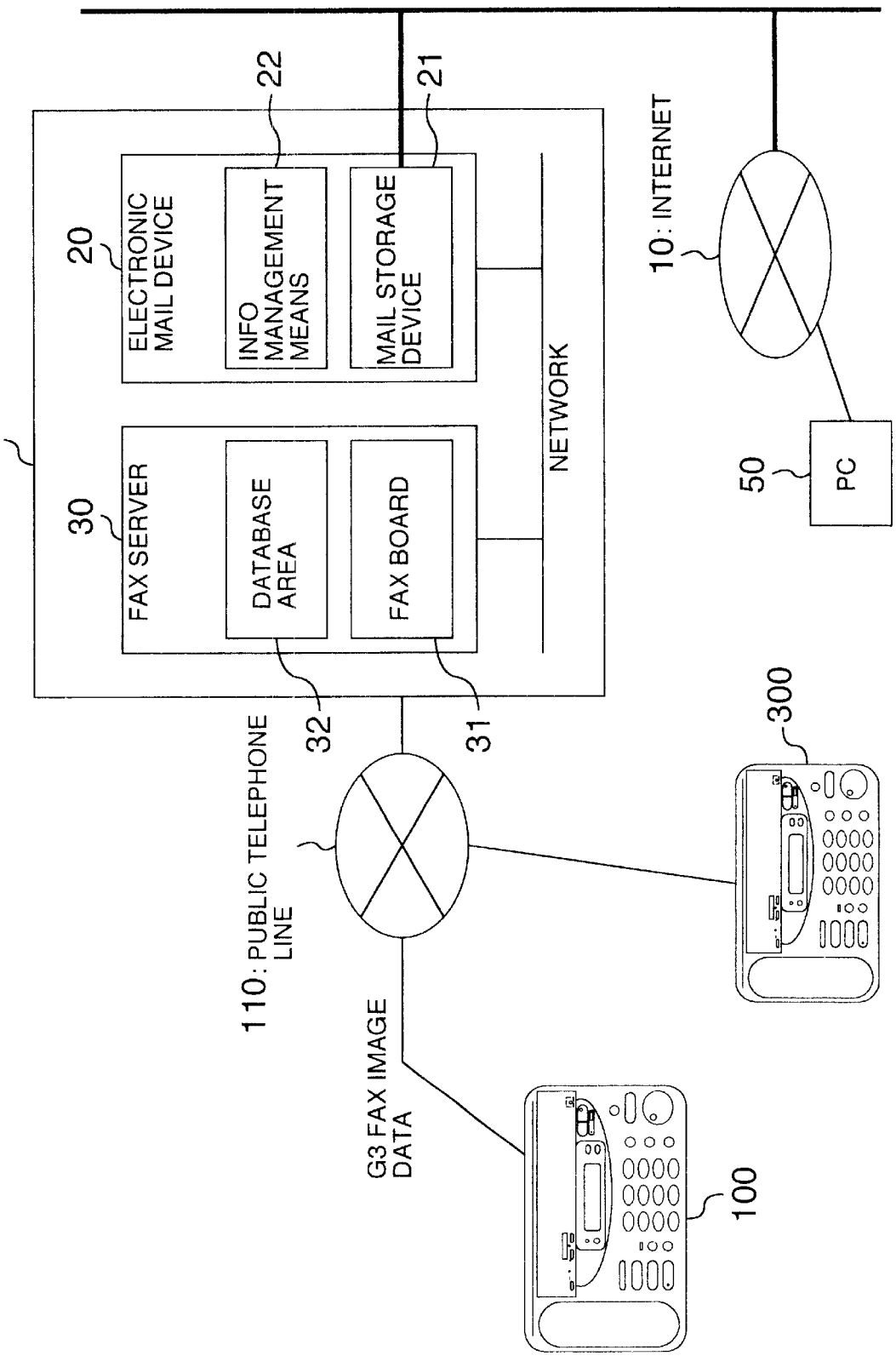
FIG. 3 is a diagram showing in block form a configuration of an e-mail server system with the facsimile machine of FIG. 1 linked thereto.

FIG. 3 illustrates an overall configuration of the e-mail server system 200. In FIG. 3, numeral 300 designates another facsimile machine.

In the e-mail server system 200, numeral 20 denotes an e-mail device that is operatively connected in a network fashion to the Internet 10 and has email send/receive functions. The email device 20 is arranged including a mail storage device 21 and an information management means having functions of managing user identifying information belonging to the email device. 30 is a facsimile (fax) server apparatus.

The fax server apparatus 30 includes a built-in fax board 31 that has fax send/receive functions and also a function of converting text data into audio/voice data of WAVE format. 32 is a database area that sets up a certain storage area for use in storing therein additive image information such as for example signature patterns and overlay graphics images or the like.

In FIG. 3, numeral 110 designates a public telephone network. The facsimile machine 100 and e-mail server system 200 are connectable together via the public network 110. 10 denotes a currently available world-wide digital data communications network (referred to hereafter as "Internet") with online email delivery services. Within the email server system 200 the email device 20 and fax server 30 are operatively interconnected together as network components; in addition, the fax board 31 offers a function of connecting with the facsimile machine 100 via the public telephone network 110. 50 denotes an email terminal equipment comprised typically of a personal computer (PC) as operated by an email recipient, which is linked to the Internet 10.

Figure 4:
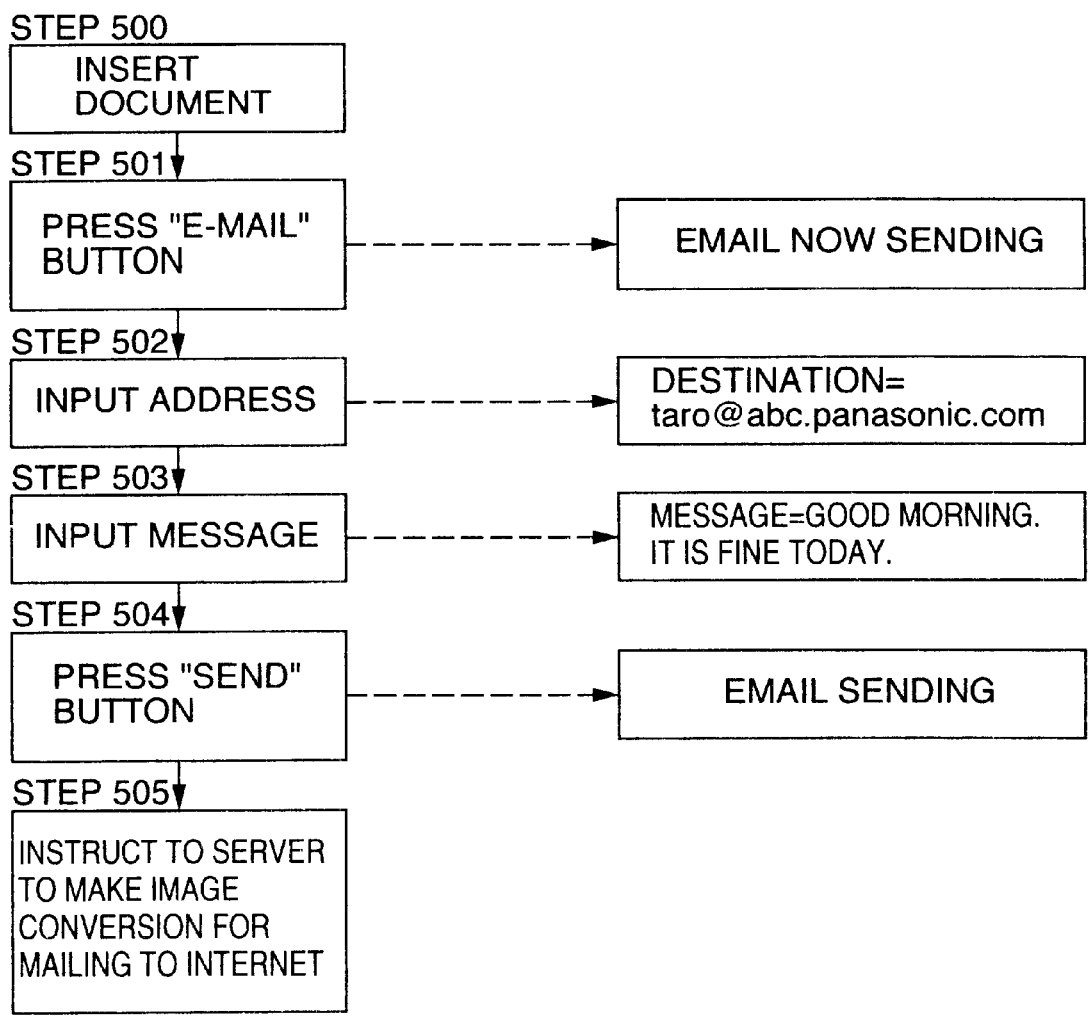
FIG. 4 is a flow chart of an operation of the facsimile machine of FIG. 1.

An explanation will next be given of an operation and control procedure in the event that an operator or user attempts to transmit an e-mail containing text data and fax images such as scanned document images. See FIG. 4, which shows one exemplary flowchart of a manual key operation when the user sends fax documents by email transmission scheme.

Firstly, the user inserts more than one fax document being mailed into a document tray (at step 500). In this state the user depresses the "Email" button 107 shown in FIG. 2 to thereby instruct email transmission (step 501). At this time a message "EMAIL NOW SENDING" is visually displayed on the screen of the display unit 106.

Then, the user uses the data entry device 104 to input an address of a target or destination party at the other end of the line (at step 502). On the display unit 106 the input address is visually indicated to read "DESTINATION= taro@abc.panasonic.com," by way of example. Next, the user uses the data entry device 104 to type and enter a string of text characters as a message to be mailed, say "mail text" (step 503). In this event the display unit 106 displays thereon such input mail-text character string such as "GOOD MORNING. IT IS FINE TODAY" after a header indication of "Message=."

The user presses the "Send" button 108 (at step 504). In responding to the user's Send button operation, the facsimile machine becomes operative to communicate with the e-mail server system 200 thereby sending forth both text data and more than one fax document image to the email server system 200 over the public network 110. The email server system 200 then operates to convert the received text data and fax image into data of prespecified form for use in a chosen email services architecture for transmission as a mail to the Internet network.

Figure 5:
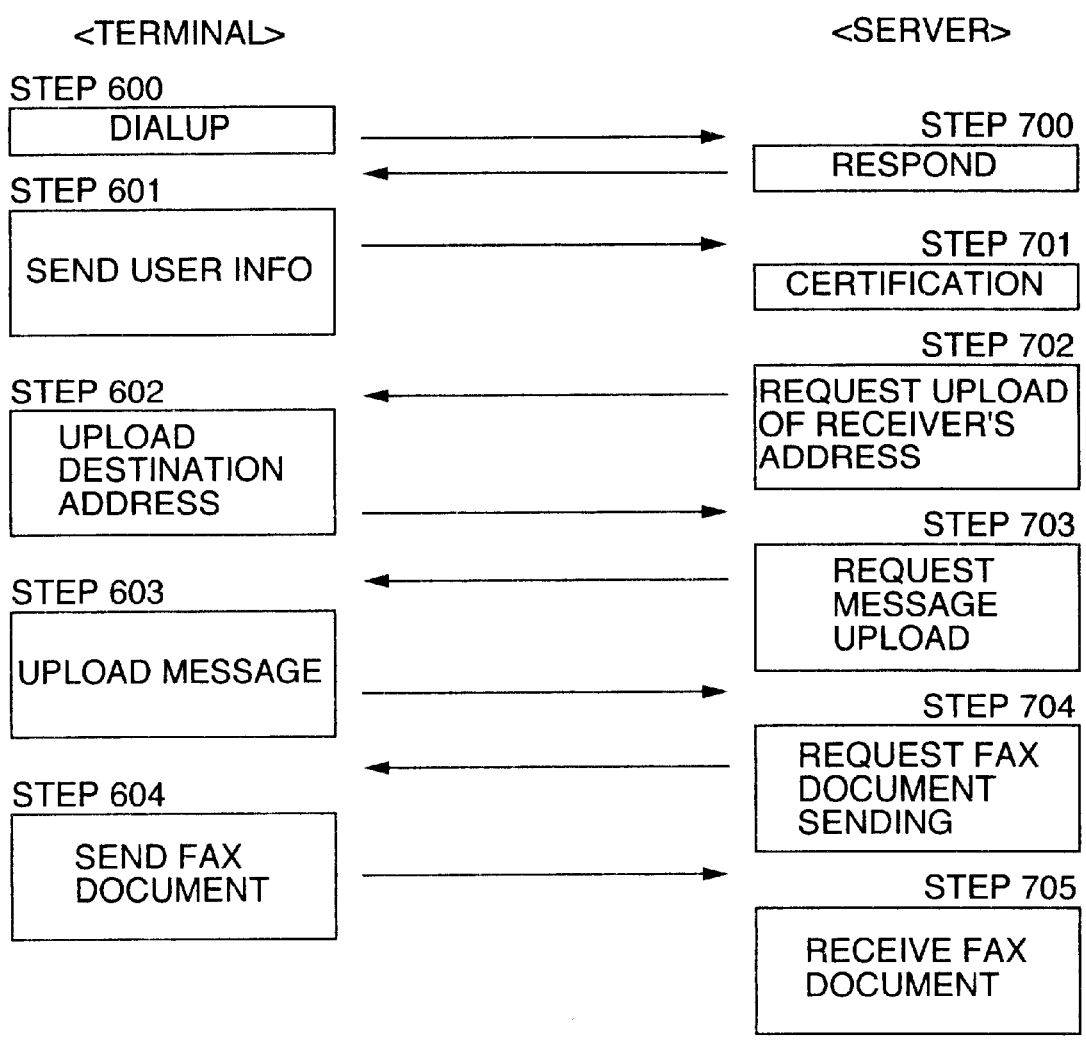
FIG. 5 is a flow chart of an operation of a communication system employing the facsimile machine and e-mail server system embodying the invention.

Turning to FIG. 5, there is depicted one example of a task flow of communication between the facsimile machine and the email server system 200. As shown herein, at step 600, the facsimile machine acting as a sender's terminal equipment embodying the invention operates to dial up a telephone number preassigned to the email server system 200 to thereby get access to the email server system 200. At step 700 the email server system 200 returns its reply indicating that the access as accepted successfully.

At step 601, the facsimile machine operates to upload user identifying information typically including a password. At step 701 the email server system 200 uses such uploaded user information to verify and determine whether it is certifiable. If the user certification is ended in success then the system procedure goes to the following steps; at step 702, the email server system 200 requests transmission of an address of the target party to which the mail of interest is routed—say, mail recipient's (receiver's) address. At step 602 the facsimile machine uploads the mail recipient's address as a mail destination address. At step 703 the email server system 200 requests provision of the content of a mail message to be sent. At step 603 the facsimile machine uploads such to-be-sent message under request. At step 704 the email server system 200 requests transmission of fax data to be sent.

At step 604, the facsimile machine transmits the fax data under delivery. At step 705 the email server system 200 receives the fax data. The email server system 200 sends an email to the Internet with the received text data being as a mail text and also with the fax document(s) as an attached file enclosed therewith.

Optionally the data entry device may be speech input equipment with voice recognizability rather than the illustrative keypad configuration. Additionally the storage device may be replaced with any other similar suitable memory devices including, but not limited to, an electrically erasable programmable read-only memory (EEPROM), also known as "Flash" PROM in the art.

It should be noted that in cases where an email is to be sent from the facsimile machine 100 to the PC 50 by way of the public telephone network 110 and email server system 200 plus Internet 10 in this order, it will possibly happen that the email has a signature and/or overlay graphics image added thereto. If this is the case, the user is permitted to register in advance or "pre-register" his or her own signature pattern and overlay image(s) to the fax server 30 from the facsimile machine 100. Such user's instructed signature/overlay-image information is recorded in the database area 32 in relation to the user's specific identification (ID) number on a one-to-one correspondence basis. Upon sending of an email from the facsimile machine 100 in this state, the fax server 30 operates to automatically combine or "synthesize" the signature and/or overlay image together for transmission of the email to PC 50.

Figure 10:
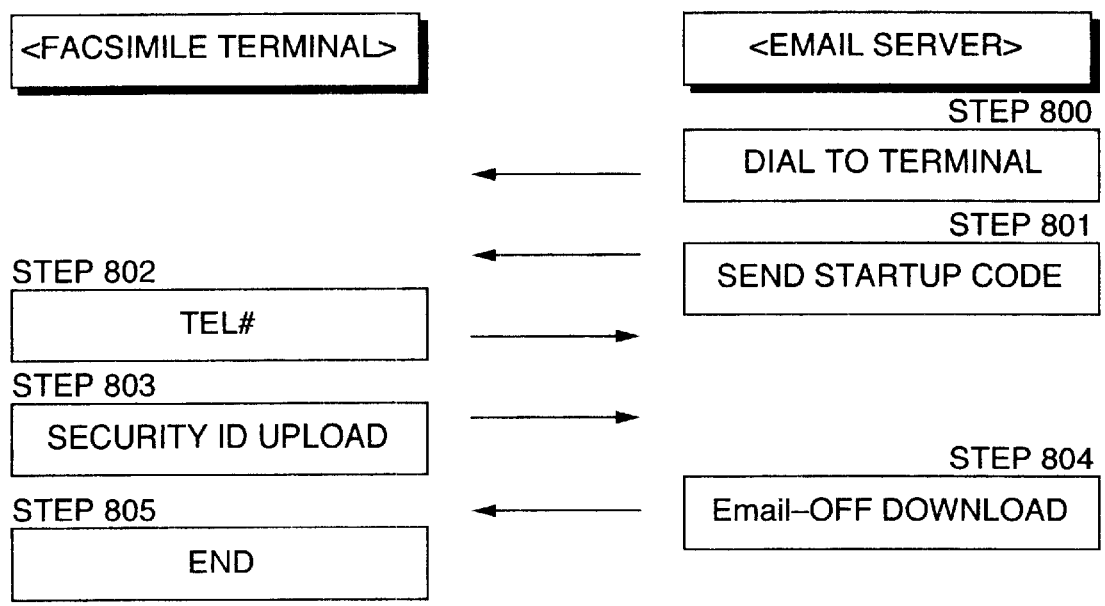
FIG. 10 is a sequence chart showing a user registration invalidation or cancellation sequence as executed in the facsimile machine.

An explanation will next be given of an embodiment which is arranged to permit the facsimile machine to offer an ability to achieve on-line registration necessary to accommodate email send/receive services or else. See FIG. 6. This diagram shows a flowchart of those manual operation tasks required during online registration of the facsimile machine with respect to its associated email server system. Also see FIGS. 7–8, each showing a user registration communication sequence. In addition, a user registration abandonment or cancellation sequence is depicted in FIG. 10. Some terminal equipment data items (such as RAM status) required for registration are shown in FIG. 9.

To perform the online user registration, three separate information items shown in FIG. 9 are necessary, which are stored in the RAM. A telephone number as shown herein is a subscriber number assigned to the user who wants to do a contract—that is, a subscriber ID number of a communication link to which the facsimile machine is connected. An "email SW" is a switch that indicates the email operation state. The default value of this information is "OFF," which will be changed to "ON" depending upon information delivery to or from the email server system 200. A security ID is a password for identification of the authorized user, which will be used in events of log-in to the email server system 200.

Figure 6:
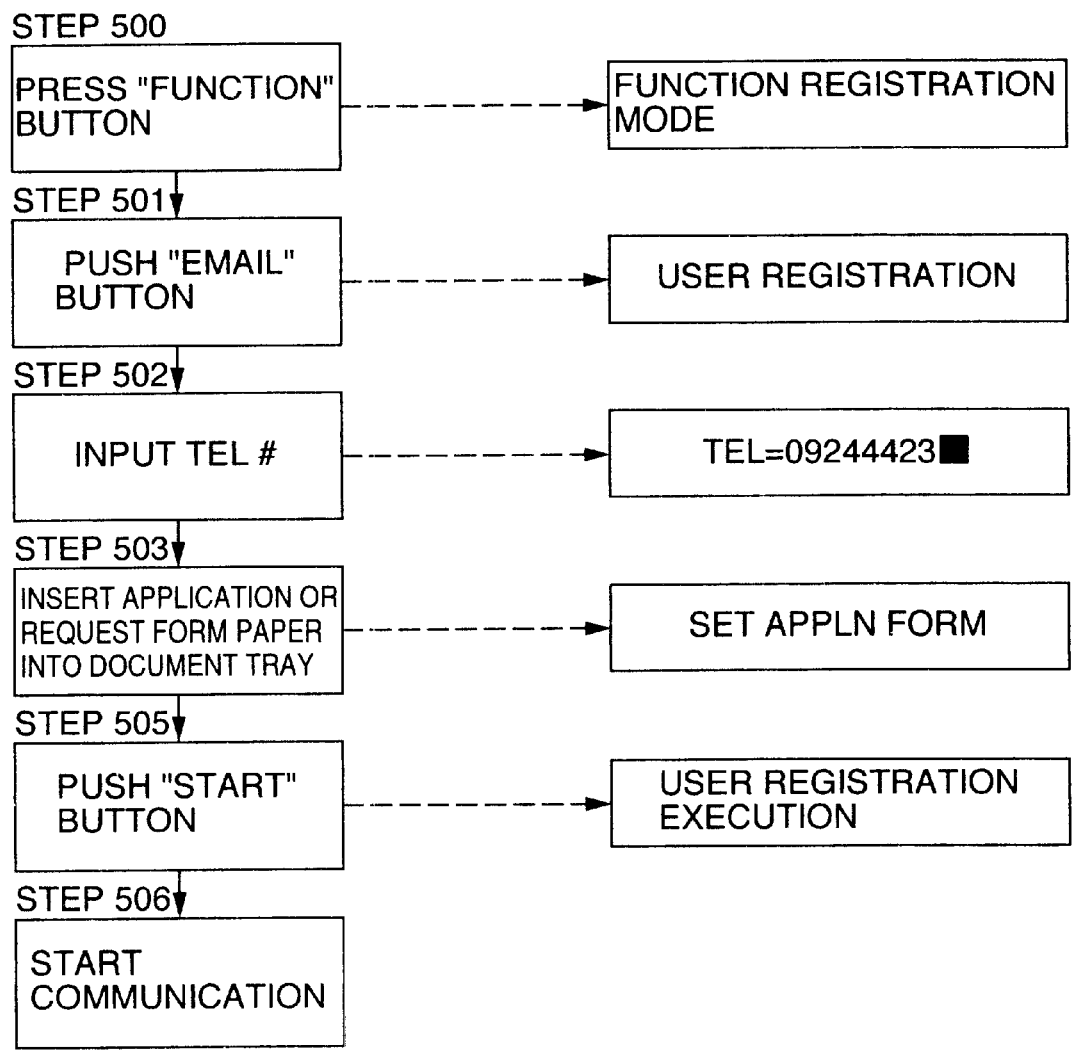
FIG. 6 is a flow chart of an operation of a facsimile machine in accordance with another embodiment of the invention during online registration with respect to its associated e-mail server.

As shown in the flowchart of FIG. 6, the user first pushes down a specific function button to instruct initiation of function setup procedure (at step 500); at this time, the display unit 107 visually displays an indication that reads "FUNCTION REGISTRATION MODE." Then, depress the "Email" button 108 to set up a system's email configuration (at step 501). The display unit 107 displays "USER REGISTRATION." Under this condition the user selects certain items necessary for user registration.

Next, the user inputs a telephone number preassigned to his or her station (at step 502). The display unit 107 visually indicates such an input phone number after a template indication of "TEL=."

Next, the user is visually prompted to set an application or request paper sheet of specified form; in responding, the user sets the application form with user's name and address filled therein (step 503). When the user presses the "Start" button 109 in this state (step 505), the illustrative facsimile machine becomes operative to call up the email server system 200 to get access thereto (step 506). This results in the facsimile machine being operatively interconnected via the telephone link to the email server system 200.

A communication sequence after the connection procedure will be explained with reference to FIG. 7. At step 600, dial-up is done to the email server system 200; at step 601, the email server system 200 generates and issues a signal responding thereto.

At step 602, the facsimile machine uploads the phone number as input in the routine procedure 502 toward the email server system 200. At step 603 the email server system 200 downloads the security ID specific to the facsimile machine. At step 604 the facsimile machine responds thereto; at step 605, the communication is terminated upon receipt of an end-of-the-service instruction. In this state the facsimile machine is such that the operation preparation has been completed except for Email SW=OFF shown in FIG. 9.

In view of possible manual operation errors such as phone number input mistakes at the facsimile machine, the embodiment above is arranged so that a sequence for user verification shown in FIG. 8 is executed in response to callup from the email server system 200 after execution of the user registration sequence shown in FIG. 7.

The user verification sequence shown in FIG. 8 will be explained in detail below. At step 700, the email server system 200 dials to the phone number as uploaded at step 602. Upon receiving of a reply from an associative party's (dialed receiver) terminal on the other end of the line, send out a startup code indicative of a server callup at step 701. After having identified the startup code, the facsimile machine uploads the phone number at step 702 and then at step 703 uploads the security ID as has been downloaded at step 603.

The email server system 200 processes to check these information items; if these are correct then transmits at step 704 data of them for setting of Email SW=ON. At step 705 the facsimile machine responds thereto and then sets up Email SW=ON at the RAM as built in the apparatus shown in FIG. 9. In accordance with a reply of the facsimile machine, the email server system 200 issues an end-of-the-procedure instruction at step 706 to interrupt the communication. In this state the email send/receive functionality becomes available.

In this embodiment, in case the user continues failing to pay required fees or in other cases, the email server system is responsible to forcibly execute a user registration cancellation procedure. The user registration canceling communication sequence will be discussed in conjunction with FIG. 10 below.

At step 800, the email server system 200 dials to the phone number that has been uploaded at said step 602. Upon receiving of a reply from the equipment on the other end of the line, send out a startup code indicative of server callup at step 801.

The facsimile machine identifies the startup code, uploads the phone number at step 802, and then uploads at step 803 the security ID as has been downloaded at the foregoing step 603.

The email server system 200 processes these information items; if they are correct then goes to step 804 which transmits data of them for setup of Email SW=OFF. The facsimile machine responds thereto at step 805, sets up Email SW=OFF at its built-in RAM shown in FIG. 9, and then ends the communication. With these tasks completed, the facsimile machine will no longer make use of the email delivery functions. As for the user registration invalidation, although the illustrative embodiment has been discussed under an assumption that it is based on the server callup, the inventive teachings are also adaptable for use in terminal callup events without requiring any principal modifications and alterations thereto.

As apparent from the foregoing description, this embodiment advantageously offers an ability to reduce or minimize complexities in system's email configuration setup procedure to thereby enhance the usability of email functions. Another advantage of the embodiment is that even where the availability of email services is to be refused due to user's failure of fee payment, it is possible to readily interrupt utilization on a server-callup basis.

Figure 11:
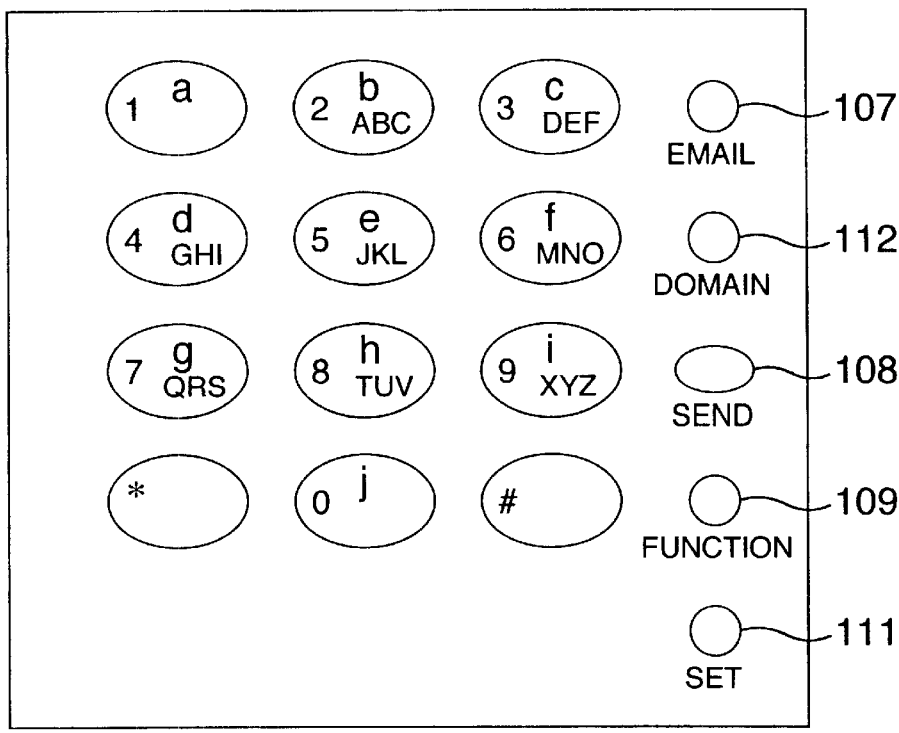
FIG. 11 is a diagram illustrating an exemplary data entry device for use in a facsimile machine in accordance with a further embodiment of the invention.

An explanation will next be given of a further embodiment that is arranged to enable preregistration of a domain name. In this example, there is registered a domain name (a string of alphabetical characters on the right-hand side of the delimiter character "@") of an address of the receiver side at the other end of a communication line to which an email is routed. This embodiment is capable of preregistering such domain name through manual operation of a specific button, i.e., "Domain Name" button. FIG. 11 shows one exemplary input device. In FIG. 11, numeral 107 designates an "Email" button for use in instructing the email function whereas 112 denotes the Domain Name button for instruction of call-up of a domain name. 108 denotes a "Send" button. 109 is a function button used for actuation of each function; 111 is "Set" button for instruction of registration of various kinds of information. The basic configuration of the facsimile machine is similar to that shown in FIG. 1 and thus an explanation thereof will be eliminated herein.

Figure 12:
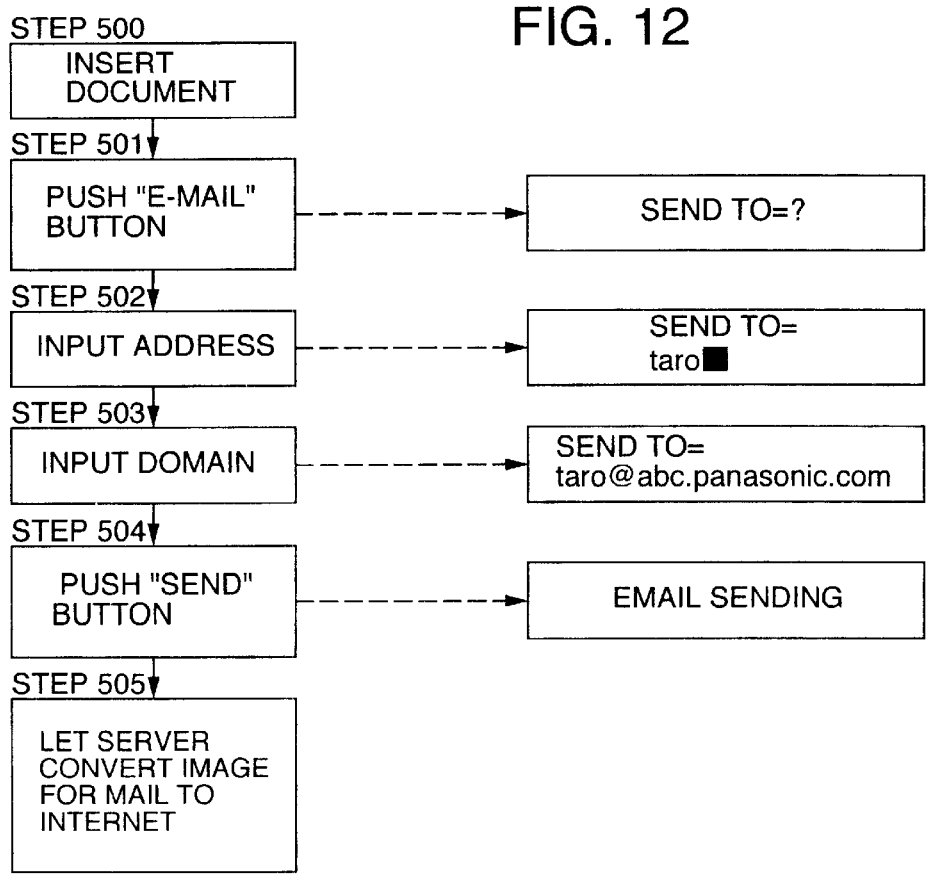
FIG. 12 is a flowchart of an e-mail delivery operation of the facsimile machine shown in FIG. 11.

See FIG. 12, which depicts a flowchart of a procedure for sending a document via email to a certain address "taro@abc.panasonic.com," for example, along with some exemplary on-screen prompt messages associated therewith. In this case the label "taro" is defined as a user name whereas the remaining portion "abc.panasonic.com" separated by the delimiter character "@" is as a domain name that consists of a sequence of subnames.

As shown in FIG. 12, the user first inserts a paper document to be mailed into the document tray (at step 500). Then, press down the Email button 107 shown in FIG. 11 (at step 501). An indication saying "SEND TO=?" is displayed on the display unit 106. Under this condition the user uses the data entry device 104 to input an address "taro" (step 502). Upon pressing down the Domain Name button 112 shown in FIG. 11, appropriate information as to the domain name is read out of a domain list as stored in the RAM 103.

Here, suppose that domain name registration has already been done by the user in relation to the "taro." Such domain name information is read for visual indication on the display unit 106. More specifically, an indication that reads "SEND TO=taro@abc.panasonic.com" is displayed at display unit 106.

Next, the user depresses the Send button 108 of FIG. 11 for performing facsimile transmission to the email server system (at step 504). In responding, the email server system converts its received fax document into graphics image data handleable by email, which is then sent forth toward the Internet as an email (step 505).

The RAM 103 may often store therein a plurality of different domain names registered. If this is the case, a system routine is executed in a way which follows. When the user presses the Domain Name button 112, specific information as to a single domain name as selected from among multiple domain names is read out for visual indication on the display unit 106. When the user further presses Domain Name button 112, information about another domain name is read to be visualized at display unit 106. To be brief, a domain name being presently displayed on display 106 is sequentially switched to another once at a time whenever the user pushes Domain Name button 112. In this way the user is permitted to make a choice of his or her desired domain name through sequential manual operations of Domain Name button 112.

Figure 13:
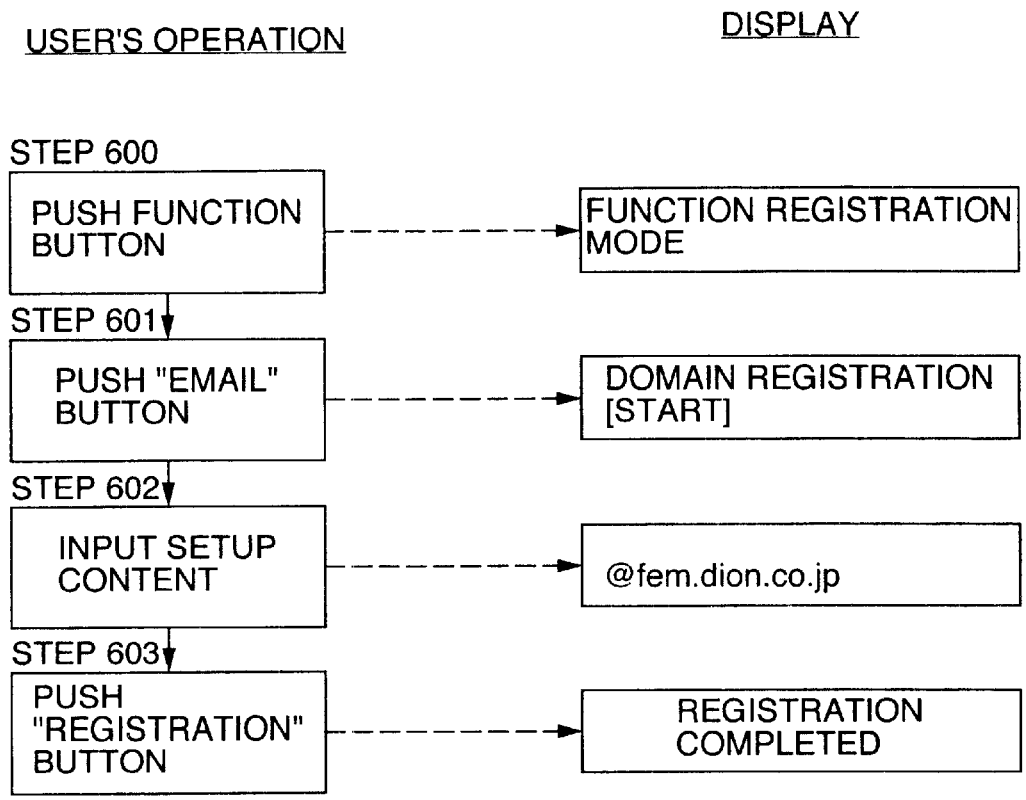
FIG. 13 is a flowchart of a domain name registration operation of the facsimile machine.

Referring to FIG. 13, there is shown a flowchart of a procedure for registration of a domain name (a character strings on the right-hand side of "@") of an address assigned to an associative or target party on the other end of the line to which an email is delivered, along with some exemplary display screens.

As shown in FIG. 13, the procedure begins with step 600 which allows the user to press down the Function button 109 shown in FIG. 11 to thereby instruct initiation of function setup. At this step a confirmation message "FUNCTION SET MODE" is visually indicated on the display unit 106. Then, the procedure goes to step 601 which permits the user to push Email button 107 for instruction of startup of email function settings. At this time the display unit 106 visualizes an indication which reads "DOMAIN NAME REGISTRATION [START]."

Figure 14:
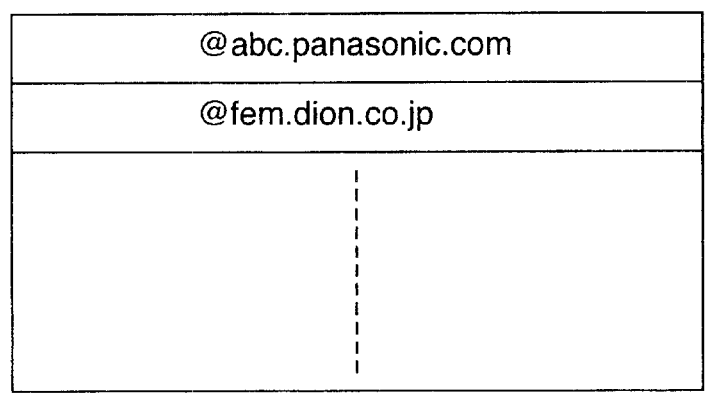
FIG. 14 is a list of multiple domains as registered in the facsimile machine.

The procedure goes next to step 602, which allows the user to input his or her preferred domain name through data entry device 104. One example is that the use types and enters "@fem.dion.co.jp," which is then displayed on display 106. The procedure then goes to step 603 which allows the user to push Set button 111 of FIG. 11 for instruction of registration. Resultant multiple domain names thus registered are stored in RAM 103 as a domain list as shown in FIG. 14.

As apparent from the above description, the illustrative embodiment advantageously offers an ability to provide the intended facsimile apparatus capable of facilitating users to readily input email addresses absolutely required in email transmission events while eliminating or at least greatly suppressing erroneous data entry risks.

It has been described that a significant advantage of the present invention lies in capability of providing facsimile apparatus offering simultaneous transmittability via e-mail of both text data as input through the facsimile equipment and fax data of graphic matter such as document images scanned.

What is claimed is:

1. A facsimile apparatus for being operatively connected via a telephone network to an electronic mail ("e-mail") server linked to the Internet, said apparatus comprising:
   an input device for use in inputting information;
   an e-mail button;
   a transmission button; and
   control means for:
   (a) prompting a user to input a destination address and mail message text, in response to operation of the e-mail button,
   (b) reading a document inserted into a document tray of the facsimile apparatus, in response to operation of the transmission button,
   (c) dialing a telephone number assigned to the e-mail server, and
   (d) transmitting to the e-mail server text data as input through said input device, fax data including a graphic image of the document, and the destination address.

2. A facsimile apparatus comprising:
   an input device for use in entering information;
   an e-mail button for instruction of an e-mail communication event;
   a transmission button for instruction of transmission;
   a line control unit for connection to a telephone network;
   a display device; and
   control means for:
   (a) allowing the display device to display an indication prompting input of a destination address, in response to the e-mail communication event instruction,
   (b) causing, in response to input of the destination address, an indication to request entry of mail message text,
   (c) reading a document positioned in a document tray, in response to operation of the transmission button,
   (d) dialing a telephone number assigned to an e-mail server,
   (e) transmitting user information including a password, in response to a request for said user information from the e-mail server,
   (f) transmitting said destination address to the e-mail server, in response to receiving a response from the e-mail server indicating that the e-mail server acquired the user information, and
   (g) transmitting to the e-mail server the mail message text and fax data obtained by reading the document.

3. A facsimile apparatus comprising:
   storage means for storing data;
   an input device for inputting information;
   an e-mail button for instruction of e-mail communication;
   a start button for instruction of transmission;
   a line control unit for connection to a telephone network;
   a display device; and
   control means, wherein said control means is operable to:
   allow the display device to display an indication requesting input of a telephone number, in response to the e-mail communication instruction,
   cause, in response to entry of the telephone number, the display device to display an indication prompting positioning of an application paper sheet of specified form onto a document tray, and
   read the application paper sheet positioned onto the document tray, in response to the transmission instruction, for transmission via the telephone network to an e-mail server.

4. A method of performing an online contract with an e-mail server, comprising:
   communicating a facsimile apparatus telephone number to the e-mail server,
   communicating, from the e-mail server to the facsimile apparatus, a security identification (ID) assigned to the facsimile apparatus,
   communicating, from the facsimile apparatus to the e-mail server, a reply and terminating communication, in response to receiving the security ID,
   employing said e-mail server to call the telephone number,
   if a communication link is made between the e-mail server and the facsimile apparatus, transmitting, from the e-mail server to the facsimile apparatus, a startup code indicating a server callup,
   identifying, with the facsimile apparatus, the startup code and sending the telephone number and the security ID to the e-mail server, in response to identifying the startup code,
   communicating, from the e-mail server to the facsimile apparatus, data indicative of e-mail service allowability, if the telephone number and security ID are received properly by the email server, and
   indicating the e-mail service allowability within the facsimile apparatus in accordance with the data indicative of e-mail service allowability.

5. A method of performing an online contract abandonment with an e-mail server, comprising:
   employing the e-mail server to call a facsimile apparatus at an assigned telephone number,
   communicating, from the e-mail server to the facsimile apparatus, a startup code that is indicative of a server call-up,
   employing the facsimile apparatus to identify the startup code and communicating, from the facsimile apparatus to the e-mail server, the telephone number and a security identification (ID),
   communicating, from the e-mail server to the facsimile apparatus, data indicating e-mail service non-allowability, if the telephone number and security ID are properly received by the e-mail server, and
   indicating the non-allowability of e-mail service within the facsimile apparatus in accordance with the data indicating e-mail service non-allowability.

6. A facsimile apparatus for being connected via a telephone network to an e-mail server linked to the Internet, said apparatus comprising:

storage means for storing data;

an e-mail button for instruction of e-mail communication;

a domain name button for instruction of call-up of a domain name;

a line controller for connection to the telephone network;

a display device; and control means, wherein
said control means is operable to:
(a) allow the display device to display an indication requesting input of a destination address, in response to the e-mail communication instruction, and
(b) control the display of a domain name stored in said storage means, in response to (i) input of said destination address and (ii) the domain name call-up instruction.

7. The facsimile apparatus as recited in claim 6, wherein:

said storage means stores a domain list and operation (b) includes control of the display device to display information of a single domain name, which is obtained from said domain list stored in said storage means, in response to (i) said input of said destination address and (ii) the domain name call-up instruction, the display device displays information of another domain name obtained from the domain list, in response to a subsequent domain name call-up instruction, and a document positioned on a document tray is read while determining a domain name in response to operation of a transmission button.

8. A facsimile apparatus for being connected via a telephone network to an e-mail server coupled to the Internet, said apparatus comprising:

storage means for storing data;

an input device for use in entering information;

an e-mail button for instruction of e-mail communications;

a send button for instruction of transmission;

a domain name button for instruction of call-up of a domain name;

a line controller for connection to the telephone network;

a display device; and control means, wherein
said control means is operable to:
(a) allow the display device to display an indication requesting input of a destination address, in response to (i) a document disposed on a document tray and (ii) the email communication instruction,
(b) cause the display device to indicate a domain name stored in said storage means, in response to the domain name call-up instruction, and
(c) read, in response to (i) a user's determination of a transmission destination address and (ii) operation of the send button, said document, disposed on said document tray, for transmission to the e-mail server.

9. The facsimile apparatus as recited in claim 8, further comprising:

a registration button for instruction of information registration; and a function button for activation of a function, wherein
said control means is operable to:
(a) initiate a domain registration function, in response to the e-mail communication instruction,
(b) set a function registration mode, in response to the function activation,
(c) display on the display device an indication showing domain registration in the domain registration function,
(d) let the storage means store the domain name, and
(e) display on the display device the domain name stored in said storage means, while displaying an indication requesting entry of the destination address.

10. A facsimile apparatus for being connected via a telephone network to an e-mail server coupled to the Internet, said apparatus comprising:

storage means for storing data;

an input device for use in entering information;

an e-mail button for instruction of e-mail communication;

a domain name button for instruction of call-up of a domain name;

a send button for instruction of transmission;

a registration button for instruction of information registration;

a line controller for connection to the telephone network;

a display device; and control means, wherein
said control means is operable to:
(a) allow the display device to display an indication requesting input of a transmission destination address, in response to the e-mail communication instruction,
(b) display on the display device domain name information obtained from a domain list stored in said storage means, in response to (i) entry of said destination address and (ii) the domain name call-up instruction,
(c) read a document, disposed on a document tray, for transmission to the e-mail server, in response to the transmission instruction, and
(d) initiate a domain registration function, in response to the e-mail communication instruction, to thereby allow said display device to display an indication showing a domain registration event and cause said storage means to store a domain name.

* * * * *